United States Patent
Yamada

(10) Patent No.: US 8,149,426 B2
(45) Date of Patent: Apr. 3, 2012

(54) IMAGE FORMING APPARATUS WITH COPY FUNCTION

(75) Inventor: Kazutaka Yamada, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1040 days.

(21) Appl. No.: 11/615,154

(22) Filed: Dec. 22, 2006

(65) Prior Publication Data

US 2007/0146779 A1 Jun. 28, 2007

(30) Foreign Application Priority Data

Dec. 27, 2005 (JP) ................................ 2005-375598

(51) Int. Cl.
*G06K 15/02* (2006.01)
*G06K 15/00* (2006.01)
*H04N 1/40* (2006.01)
*G06F 3/12* (2006.01)

(52) U.S. Cl. ...................... 358/1.11; 358/3.28; 358/1.13; 358/1.14; 358/1.15; 358/1.16; 358/1.18

(58) Field of Classification Search .................... 358/1.2, 358/2.1, 2.99, 3.31, 1.11, 407, 448, 3.03, 358/1.13–1.15, 3.28, 1.16, 1.18; 382/162, 382/164, 176, 177, 182, 229, 290
See application file for complete search history.

(56) References Cited

U.S. PATENT DOCUMENTS

| | | | | |
|---|---|---|---|---|
| 5,506,697 A | * | 4/1996 | Li et al. .......................... | 358/448 |
| 5,509,092 A | * | 4/1996 | Hirayama et al. ............ | 382/301 |
| 5,535,120 A | * | 7/1996 | Chong et al. ...................... | 704/3 |
| 5,881,168 A | * | 3/1999 | Takaoka et al. ............... | 382/180 |
| 6,246,769 B1 | * | 6/2001 | Kohut ............................. | 380/45 |
| 6,282,314 B1 | * | 8/2001 | Sugiura et al. ................ | 382/173 |
| 6,304,313 B1 | * | 10/2001 | Honma .......................... | 355/18 |
| 6,333,788 B1 | * | 12/2001 | Yamada et al. .............. | 358/1.15 |
| 6,634,559 B2 | * | 10/2003 | Shioda et al. ................. | 235/487 |
| 6,697,165 B2 | * | 2/2004 | Wakai et al. ................. | 358/1.11 |
| 6,901,166 B1 | * | 5/2005 | Nakayama .................... | 382/182 |

(Continued)

FOREIGN PATENT DOCUMENTS

JP H07-40603 A 2/1995

(Continued)

OTHER PUBLICATIONS

Japanese Patent Office, Notice of Reason(s) for Rejection of Japanese Patent Appl'n No. 2005-375598 (parent to above-captioned U.S. patent appl'n), mailed Jan. 15, 2008 (Partial English Translation—providing a concise statement of relevance of previously submitted Japanese Patent Publ'n Nos. H09-091363 and H09-247318).

*Primary Examiner* — James A Thompson
*Assistant Examiner* — Jonathan Beckley
(74) *Attorney, Agent, or Firm* — Baker Botts L.L.P.

(57) ABSTRACT

An image forming apparatus with a copy function may include a reading device, a recognition device, a conversion device, and a print device. The reading device reads characters on a first recording medium. The recognition device recognizes the characters based on a result of reading performed by the reading device. The conversion device converts a result of recognition performed by the recognition device into image data which indicates shapes of the characters. The print device prints the characters on a second recording medium based on the image data.

12 Claims, 14 Drawing Sheets

U.S. PATENT DOCUMENTS

| | | | |
|---|---|---|---|
| 7,136,831 B2 * | 11/2006 | Mori et al. | 705/28 |
| 7,228,428 B2 * | 6/2007 | Cousins et al. | 713/179 |
| 7,761,591 B2 * | 7/2010 | Graham | 709/233 |
| 2004/0191731 A1 * | 9/2004 | Stork | 434/180 |
| 2005/0122540 A1 * | 6/2005 | Kadowaki | 358/1.15 |
| 2005/0286765 A1 * | 12/2005 | Nakayama | 382/182 |
| 2006/0036585 A1 * | 2/2006 | King et al. | 707/3 |
| 2006/0206305 A1 * | 9/2006 | Kimura et al. | 704/2 |
| 2006/0280338 A1 * | 12/2006 | Rabb | 382/114 |

FOREIGN PATENT DOCUMENTS

| | | |
|---|---|---|
| JP | H08-132683 A | 5/1996 |
| JP | H09-091363 A | 4/1997 |
| JP | H09-247318 A | 9/1997 |
| JP | 20049626 A | 1/2004 |
| JP | 200482473 A | 3/2004 |

* cited by examiner

MAIN SCANNING DIRECTION

FIG. 9

| FONT NAME | FONT SIZE | STYLE | FONT COLOR | START POSITION | END POSITION | START POSITION | END POSITION | ... |
|---|---|---|---|---|---|---|---|---|
| Arial | 8 pt | Normal | 255, 255, 255 | 1 | 123 | 234 | 400 | ... |
| MS GOTHIC | 10 pt | Bold | 255, 0, 0 | 150 | 190 | ... | ... | ... |
| ... | ... | ... | ... | ... | ... | ... | ... | ... |

FIG. 15A 14b

YOU NEED A PASSWORD FOR PRINTING THE DATA.
I_ _ _ _ _ _ _ _ _ _ _ _ _ _ _ _ _
1: INPUT FINISHED            2: CANCEL

FIG. 15B 14b

"ARIAL" IS NOT INSTALLED IN THIS PRINTER.
DO YOU WANT TO CHANGE THE FONT ?

1: YES          2: NO

FIG. 15C 14b

WHICH FONT DO YOU USE INSTEAD OF "ARIAL" ?

1: MINCHO
2: ROUNDED GOTHIC
3: SHARP GOTHIC

IMAGE FORMING APPARATUS WITH COPY FUNCTION

CROSS-REFERENCE TO RELATED APPLICATIONS

This application claims the benefit of Japanese Patent Application No. 2005-375598 filed Dec. 27, 2005 in the Japan Patent Office, the disclosure of which is incorporated herein by reference.

BACKGROUND

This invention relates to an image forming apparatus which can print characters on a recording medium. Particularly, this invention relates to an image forming apparatus with a copy function wherein characters, printed on an original (a recording medium), can be printed on another recording medium.

As this type of image forming apparatus with a copy function, a copier has been conventionally known wherein an image on an original is optically read and the read image is printed on a recording medium. When reproduction is performed by the copier, however, reproduced characters sometimes turn out to be indistinct due to taint or the like in an optical system of the copier. Therefore, a technique has been introduced wherein a two-dimensional barcode is printed on a business card so as to indicate print control information (i.e., character code, font, size, style, and position) regarding the content of the image printed thereon. Equivalent business cards can be printed by reading the two-dimensional barcode.

SUMMARY

However, if all the information, such as character code, font, size, style, and position, should be stored in a two-dimensional barcode as described above, the number of characters, corresponding to a character code indicated by a two-dimensional barcode, is limited because the amount of data that can be stored in a two-dimensional barcode is limited. Therefore, the above-described technique is not suitable for reproducing a number of characters that compose a text. In consideration of the above and other problems, it may be preferable to provide an image forming apparatus with a copy function wherein a number of characters can be clearly reproduced.

In one aspect of the present invention, an image forming apparatus with a copy function may include a reading device, a recognition device, a conversion device, and a print device. The reading device reads characters on a first recording medium. The recognition device recognizes the characters based on a result of reading performed by the reading device. The conversion device converts a result of recognition performed by the recognition device into image data which indicates shapes of the characters. The print device prints the characters on a second recording medium based on the image data.

BRIEF DESCRIPTION OF THE DRAWINGS

The invention will now be described below, by way of example, with reference to the accompanying drawings, in which:

FIG. 9 is an explanatory view showing an example of font information table created in the personal computer;

FIGS. 15A to 15C are explanatory views respectively showing an example of a screen display shown in the multi function apparatus in the character information obtaining process.

DETAILED DESCRIPTION OF THE PREFERRED EMBODIMENT

[Mechanical Structure of Multi Function Apparatus 1]

Figure 1:
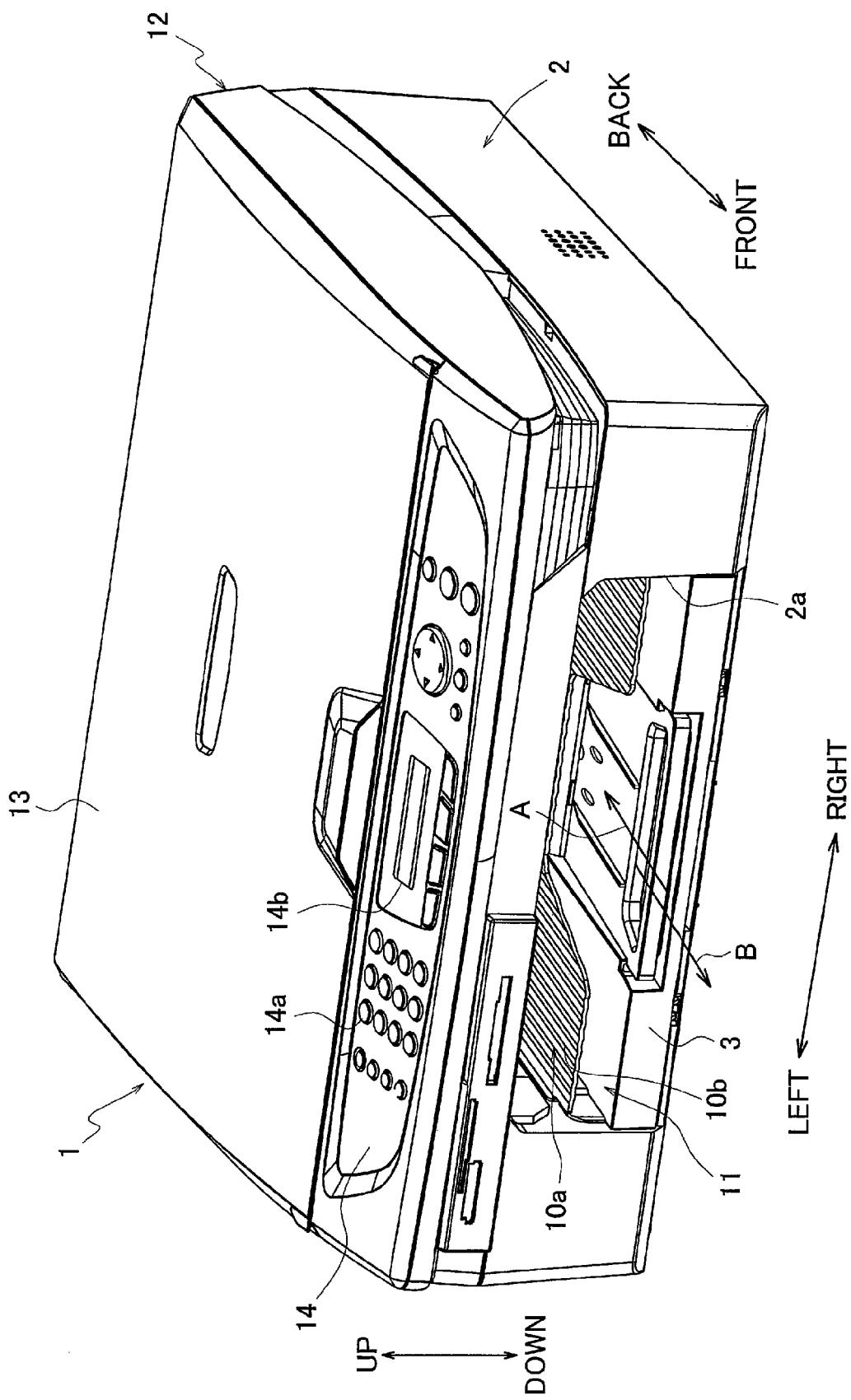
FIG. 1 is a perspective view showing an overall structure of a multi function apparatus according to an embodiment to which the present invention is applied.
Figure 2:
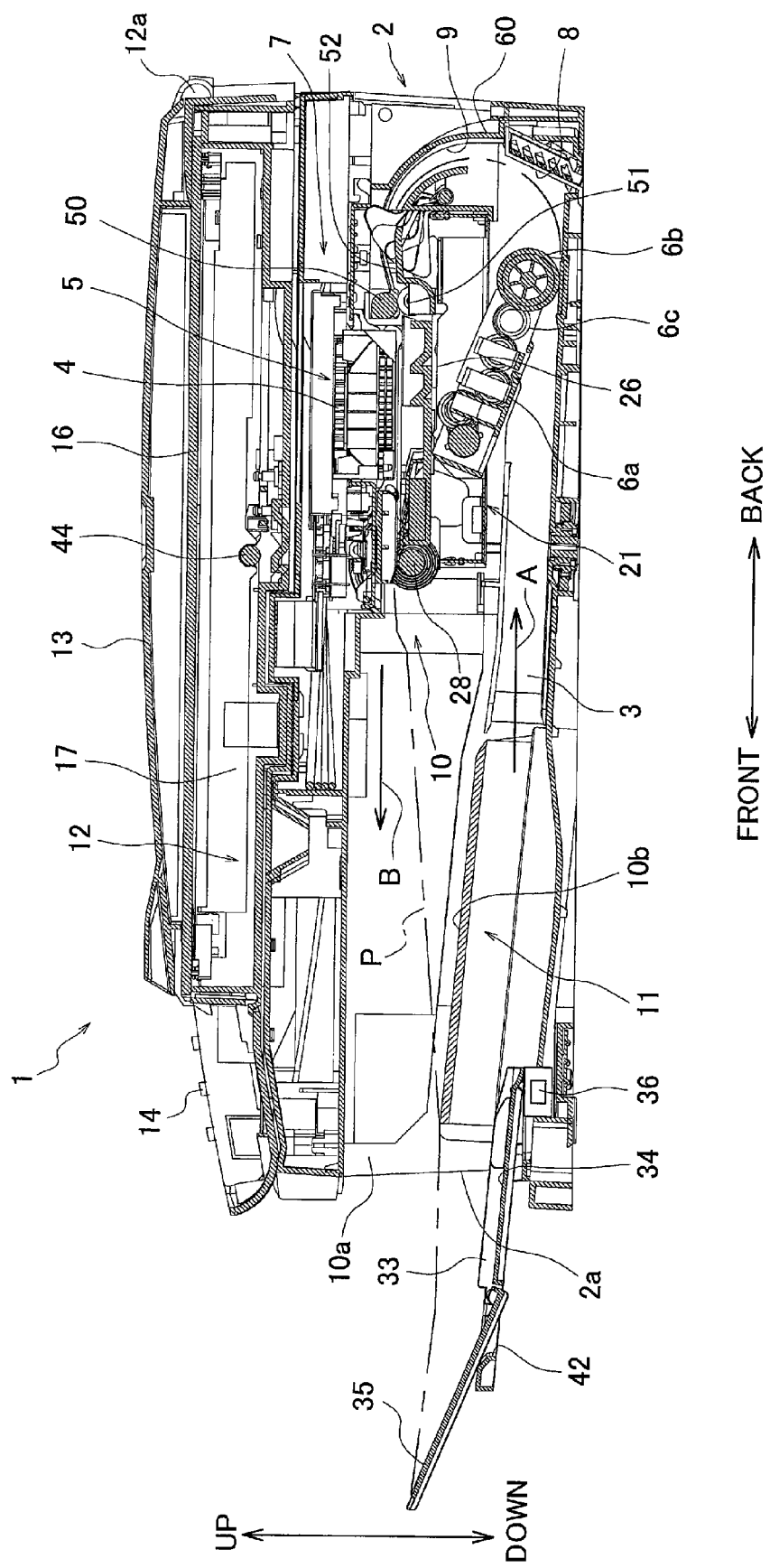
FIG. 2 is a sectional side view showing the structure of the multi function apparatus according to the embodiment.

A multi function apparatus 1 according to a present embodiment includes a printer function, a copy function, a scanner function, and a facsimile function. As shown in FIGS. 1 and 2, in the upper portion of a housing 2, made of synthetic resin, an image reading unit 12 is disposed.

The image reading unit 12 can be rotated on an axis (not shown), disposed in the left end portion of the image reading unit 12, in an up-and-down direction with respect to the housing 2. The image reading unit 12 can be opened and closed by rotating the image reading unit 12 on the axis. A cover 13 covers the top surface of the image reading unit 12. The cover 13 can be rotated on an axis 12a (see FIG. 2), disposed in the rear end portion of the image reading unit 12, in the up-and-down direction with respect to the image reading unit 12. The cover 13 can be opened and closed by rotating the cover 13 on the axis 12a.

As shown in FIG. 2, on the top surface of the image reading unit 12, a glass plate 16 is disposed. When the cover 13 is lifted up, an original to be read is placed on the glass plate 16. Beneath the glass plate 16, an image scanner unit (CIS: Contact Image Sensor) 17 is disposed for reading an original. The image scanner unit 17 can be reciprocated along a guide shaft 44 extending in a direction perpendicular to the surface of FIG. 2 (in a left-to-right direction).

As shown in FIGS. 1 and 2, in front of the image reading unit 12, an operation panel 14 is disposed. The operation panel 14 includes operation buttons 14a used for input operation, and a display panel (e.g. LCD) 14b which displays various information. The operation buttons 14a are known type of buttons including arrow keys, an enter key, a cancel key, and number keys.

In the bottom portion of the housing 2, a paper feed unit 11 is disposed for feeding recording paper P as a recording medium. In the paper feed unit 11, a paper feed cassette 3 can be disposed through an opening 2a, formed in the front side of the housing 2. The paper feed cassette 3 stores recording paper P in a stacked manner. The paper feed cassette 3 can be attached/detached with respect to the housing 2 in a front-to-back direction.

As shown in FIG. 2, in the back side (the rear end side) of the paper feed cassette 3, inclined separation board 8 is disposed. The inclined separation board 8 is formed in a convexly curved shape in a plan view, wherein the center portion of the inclined separation board 8 in the width direction of the recording paper P (in the left-to-right direction) is projected, and the projection recedes toward the left and right end portions thereof. In the center portion of the inclined separation board 8 in the width direction of the recording paper P, resilient separation pads in a saw-tooth appearance are disposed so as to be abutted on the leading end of recording paper P and to facilitate separation.

In the paper feed unit 11, a paper feed arm 6a is disposed for feeding recording paper P from the paper feed cassette 3. A basal end of the paper feed arm 6a is disposed in the rear end side of the housing 2 so as to be rotatable in the up-and-down direction. A leading end of the paper feed arm 6a is provided with a paper feed roller 6b. By a gear transmission mechanism 6c provided in the paper feed arm 6a, driving force is transmitted from a LF (conveyance) motor 131 (see FIG. 6) to the paper feed roller 6b. By the paper feed roller 6b and the resilient separation pads of the inclined separation board 8, recording paper P, stacked in the paper feed cassette 3, is separated and conveyed in a sheet-by-sheet manner. The recording paper P, separated and fed along a paper feed direction (direction of arrow A), is conveyed through a feed path 9 to a recording unit 7. The feed path 9 includes a path formed between a first conveyance member 60 and a second conveyance member 52 in a shape curved like a laterally-turned U-shape. The recording unit 7 is disposed above the paper feed cassette 3 (in the upper portion of the housing 2).

Figure 3:
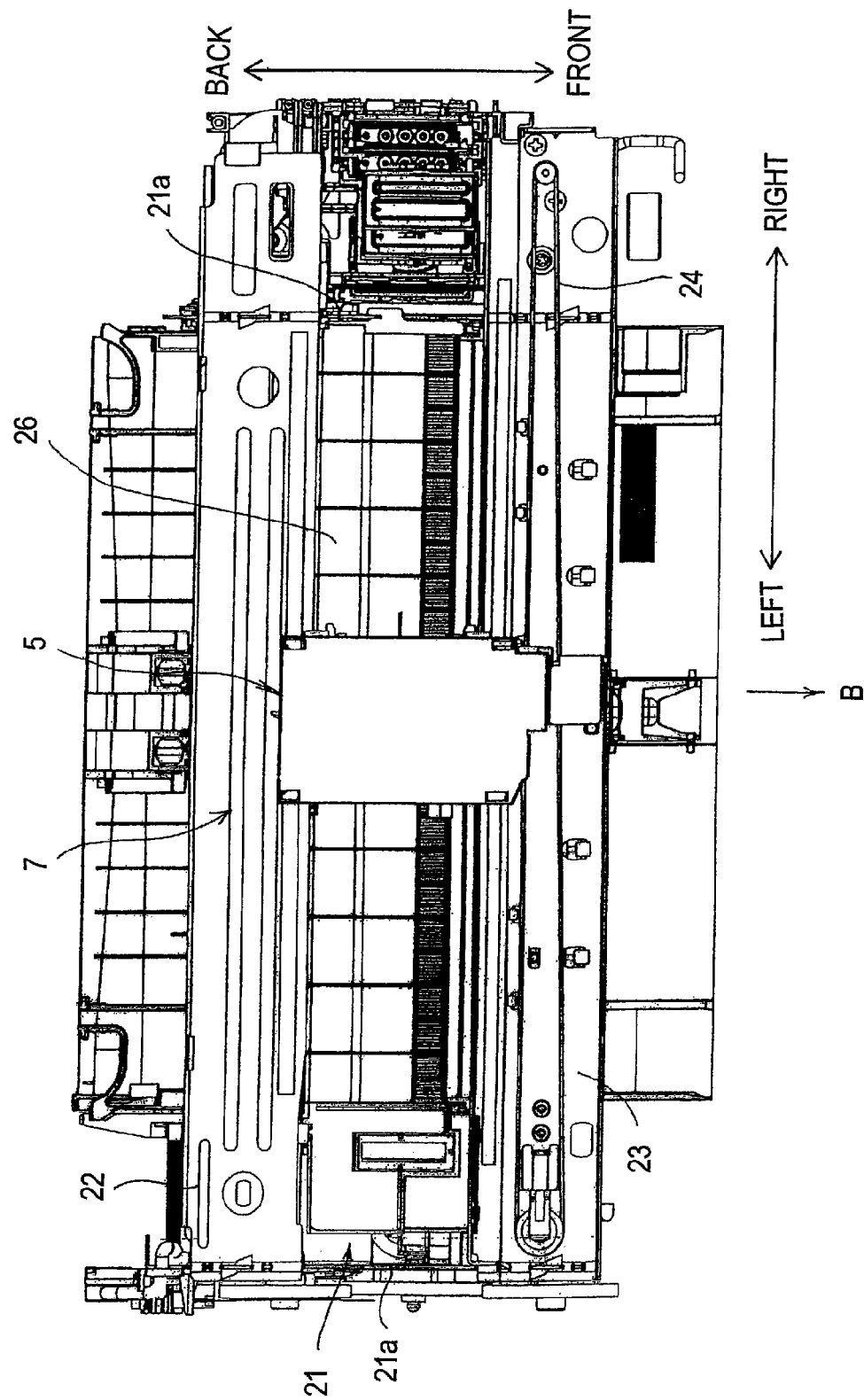
FIG. 3 is a plan view showing an internal structure of the multi function apparatus according to the embodiment, except an image reading unit disposed therein.

As shown in FIG. 3, the recording unit 7 includes a main frame 21, a first guide member 22, and a second guide member 23. The main frame 21 is formed in a box shape which is upwardly open. The main frame 21 includes a pair of side walls 21a disposed on the left and right sides thereof. The first and second guide members 22 and 23 are formed in a horizontally long plate shape, extending in the left-to-right direction (main scanning direction), and supported by the pair of side walls 21a. Between the first and second guide members 22 and 23, an inkjet recording head 4 (see FIGS. 2 and 4) and a carriage 5 are disposed. The recording head 4 records an image on recording paper P by ejecting ink from the bottom surface thereof. The carriage 5 carries the recording head 4.

The carriage 5 is slidably supported by the first guide member 22, disposed in an upstream side in a paper discharge direction (direction of arrow B), and the second guide member 23 disposed in the downstream side. The carriage 5 can be reciprocated in the left-to-right direction. On the top surface of the second guide member 23 disposed in the downstream side in the paper discharge direction (direction of arrow B), a timing belt 24 is wound and extending in the main scanning direction (left-to-right direction) so as to reciprocate the carriage 5. A CR (carriage) motor 132 (see FIG. 6), which drives the timing belt 24, is disposed on the bottom surface of the second guide member 23.

In the recording unit 7, a flat platen 26, extending in the left-to-right direction, is disposed beneath the bottom surface of the recording head 4, carried by the carriage 5, so as to face the recording head 4. The platen 26 is disposed between the above-described guide members 22 and 23, and attached to the main frame 21.

As shown in FIG. 2, in the upstream side of the platen 26 in the paper discharge direction (direction of arrow B), a drive roller 50 and a nip roller 51 are disposed. The drive roller 50 is used for conveying recording paper P to the bottom surface of the recording head 4. The nip roller 51 is disposed beneath the drive roller 50 and faces the drive roller 50. In the downstream side of the platen in the paper discharge direction (direction of arrow B), a paper discharge roller 28 and a spur roller (not shown) are disposed. The paper discharge roller 28 conveys recording paper P, which has passed through the recording unit 7, to the paper discharge unit 10 along the paper discharge direction (direction of arrow B). The spur roller faces the paper discharge roller 28 and is biased toward the paper discharge roller 28.

The paper discharge unit 10 is disposed above the paper feed unit 11. In the paper discharge unit 10, recording paper P, on which recording is performed in the recording unit 7, is discharged with a recording surface thereof facing upward. A paper discharge exit 10a is provided in one portion of the opening 2a disposed in the front side of the housing 2. Recording paper P, discharged from the paper discharge unit 10 in the paper discharge direction (direction of arrow B), is stacked on a paper discharge tray 10b disposed inside of the housing 2 behind the opening 2a.

In the right front portion of the housing 2, covered by the image reading unit 12, an ink reserving unit (not shown) is disposed. In the ink reserving unit, four ink cartridges, containing four colors of ink (black (Bk), cyan (C), yellow (Y), and magenta (M)) for full-color printing, are disposed. The ink cartridges are attachable/detachable while the image reading unit 12 is lifted upward and the housing 2 is opened. The ink cartridges for respective colors and the above-described recording head 4 are connected by four flexible ink supply tubes (not shown). The inks stored in the respective ink cartridges are supplied to the recording head 4 through the respective ink supply tubes.

Figure 4:
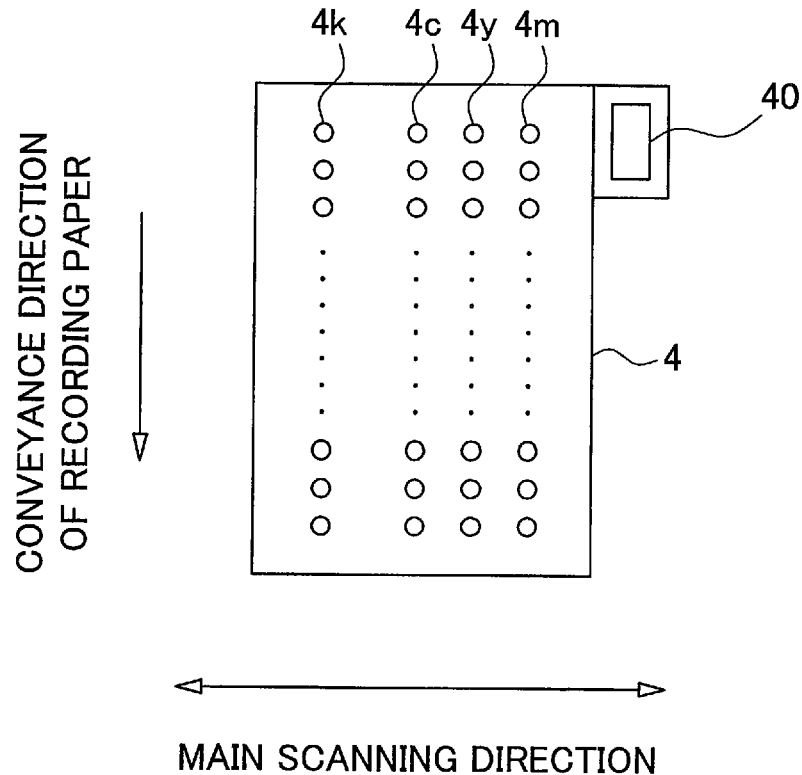
FIG. 4 is a diagram showing a recording head of the multi function apparatus as viewed from a bottom surface thereof.

As shown in FIG. 4, the recording head 4 includes nozzle arrays 4k, 4c, 4y, and 4m respectively having a plurality of nozzles aligned along the conveyance direction (paper discharge direction, sub-scanning direction) of the recording paper P. Specifically, the four nozzle arrays 4k, 4c, 4y, and 4m are disposed in parallel for ejecting the four colors of inks (black (Bk), cyan (C), yellow (Y), and magenta (M)) used for full-color printing.

The recording head 4 is provided with a media sensor 40 which can detect an end of recording paper P in the width direction (left-to-right direction), that is an end along the conveyance direction). The media sensor 40 is an optical sensor (reflective sensor) including a light-emitting element (such as a light-emitting diode) and a light-receiving element (such as a phototransistor). The media sensor 40 detects existence of recording paper P, disposed thereunder, by emitting light from the light-emitting element and receiving the reflected light with the light-receiving element.

Figure 5:
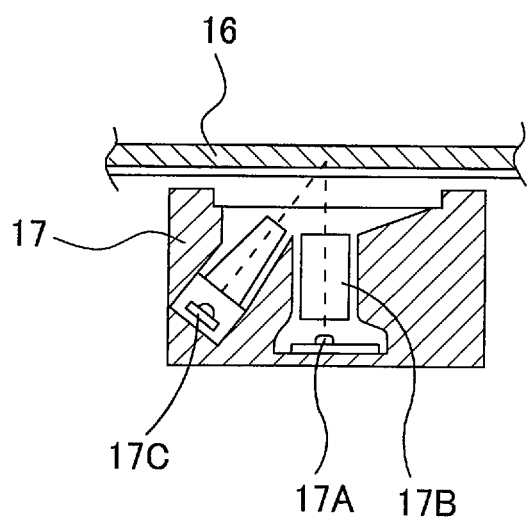
FIG. 5 is a cross-sectional view showing an internal structure of an image scanner unit of the multi function apparatus according to the embodiment.

As shown in FIG. 5, the image scanner unit 17 includes an image device 17A, a Selfoc lens 17B, and a light source 17C. Light is emitted from the light source 17C to an original placed on the glass plate 16. The light reflected on the original is transmitted through the Selfoc lens 17B to the image device 17A. An image formed by the reflected light is read by the image device 17A.

[Control System of Multi Function Apparatus 1]

Figure 6:
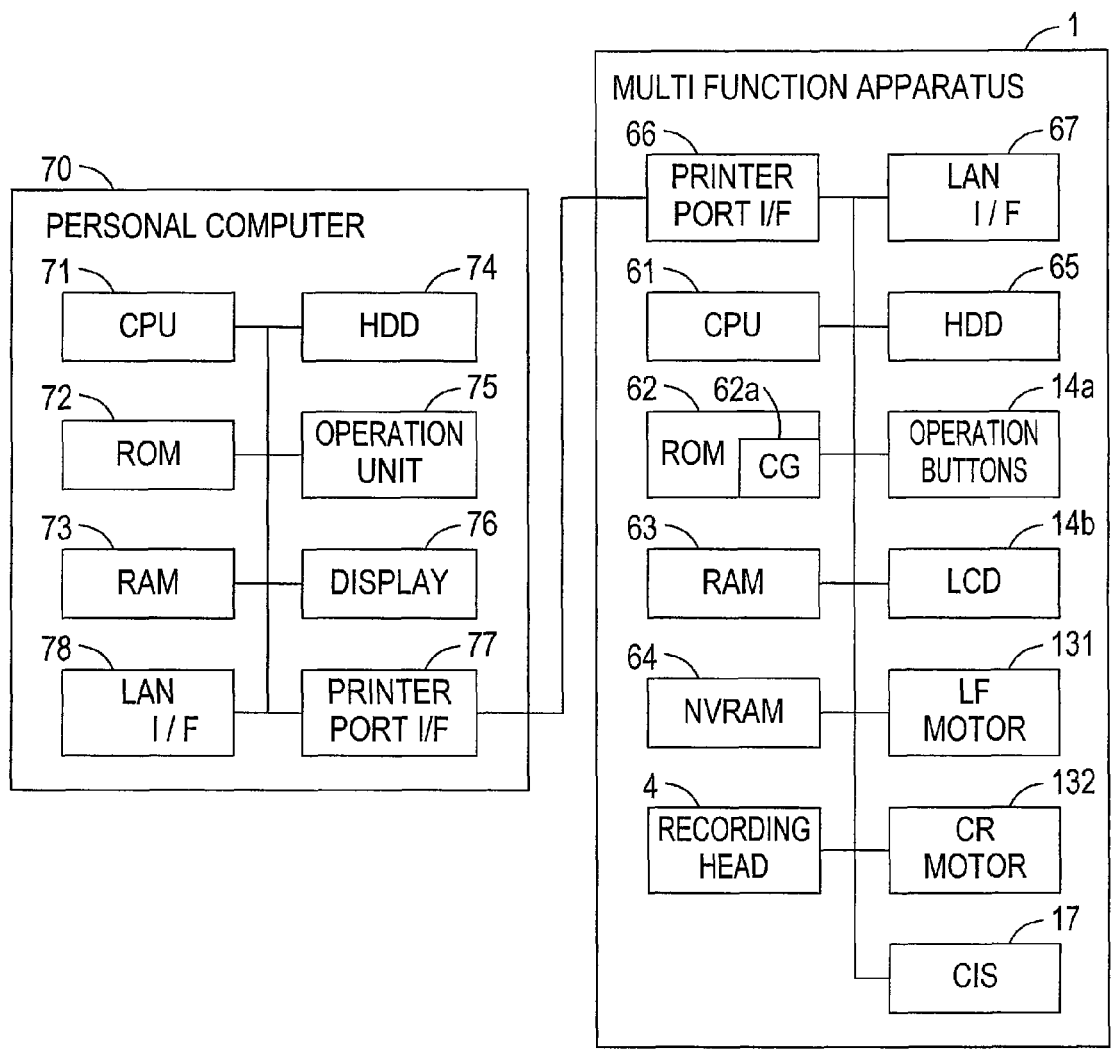
FIG. 6 is a block diagram showing a structure of a control system of the multi function apparatus according to the embodiment, and a personal computer connected to the multi function apparatus.

The following describes the control system of the multi function apparatus 1 with reference to the block diagram in FIG. 6. As shown in FIG. 6, the multi function apparatus 1 includes a CPU (Central Processing Unit) 61, a ROM (Read-Only Memory) 62, and a RAM (Random Access Memory) 63. The CPU 61 performs various operations. The ROM 62 stores control programs, including programs for performing processes to be described later, and so on. The RAM 63 temporarily stores various data. In one portion of the storage area of the ROM 62, a CG (character generator) 62a is provided. The CG 62a converts a character code into bitmap data (image data), which indicates the shape of a character, based on font information of the character code.

The above-described CPU 61 is connected to an NVRAM 64, a hard disc device (HDD) 65, and so on. The NVRAM 64 stores data such that the data is not erased even when a power source switch is turned off. The CPU 61 is furthermore connected to a printer port interface (printer port I/F) 66, a LAN interface (LAN I/F) 67, the above-described operation buttons 14a, the LCD 14b, the image scanner unit (CIS) 17, the LF motor 131, the CR motor 132, and so on. The printer port I/F 66 is used so as to connect the multi function apparatus 1 to an external device, e.g. a personal computer (to be referred to as PC) 70. The LAN I/F 67 is used so as to connect the multi function apparatus 1 to a LAN (not shown).

The PC 70 also includes a CPU 71, a ROM 72, and a RAM 73. The CPU 71 is connected to a hard disc device (HDD) 74, an operation unit 75 including a key board and a mouse, a display unit 76 (such as a CRT), a printer port interface (printer port I/F) 77, and a LAN interface (LAN I/F) 78. The printer port I/F 77 is used so as to connect the PC 70 to the multi function apparatus 1. The LAN I/F 78 is used so as to connect the PC 70 to a LAN (not shown). The multi function apparatus 1 and the PC 70 may be connected via the LAN interfaces 67 and 78.

[Print process]

The following describes print process executed by the above-described control systems. Firstly, the print process executed in the PC 70 will be explained with reference to FIG. 7. This process is performed by the CPU 71 when printing is instructed in order to print a text (test data) composed by using the PC 70 and an application, wherein a text can be inputted and a font type, a font size, style, and so on can be also set, as shown in an example of a screen display in FIG. 8.

Figure 7:
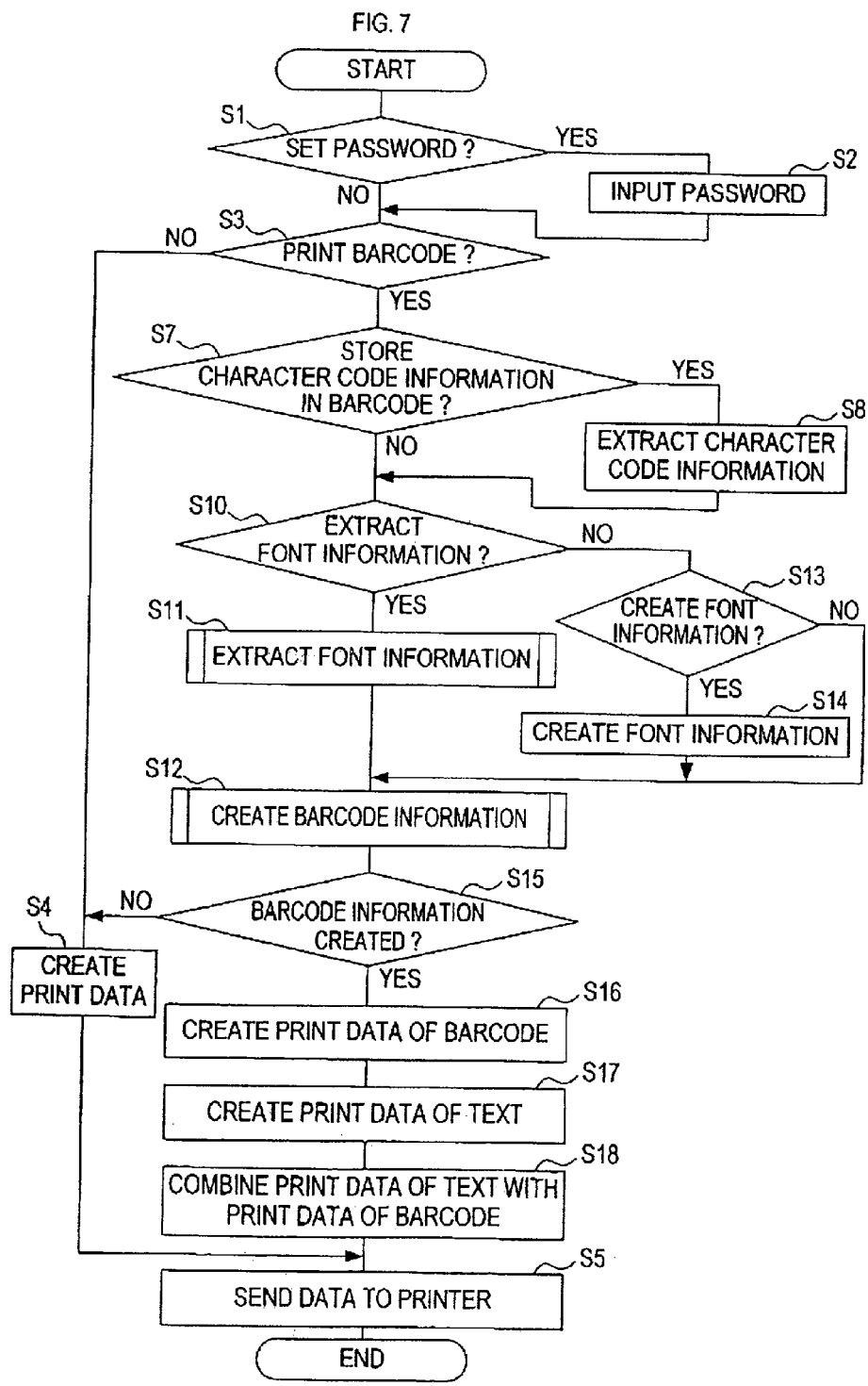
FIG. 7 is a flowchart describing a process performed in the control system of the personal computer according to the embodiment.
Figure 8:
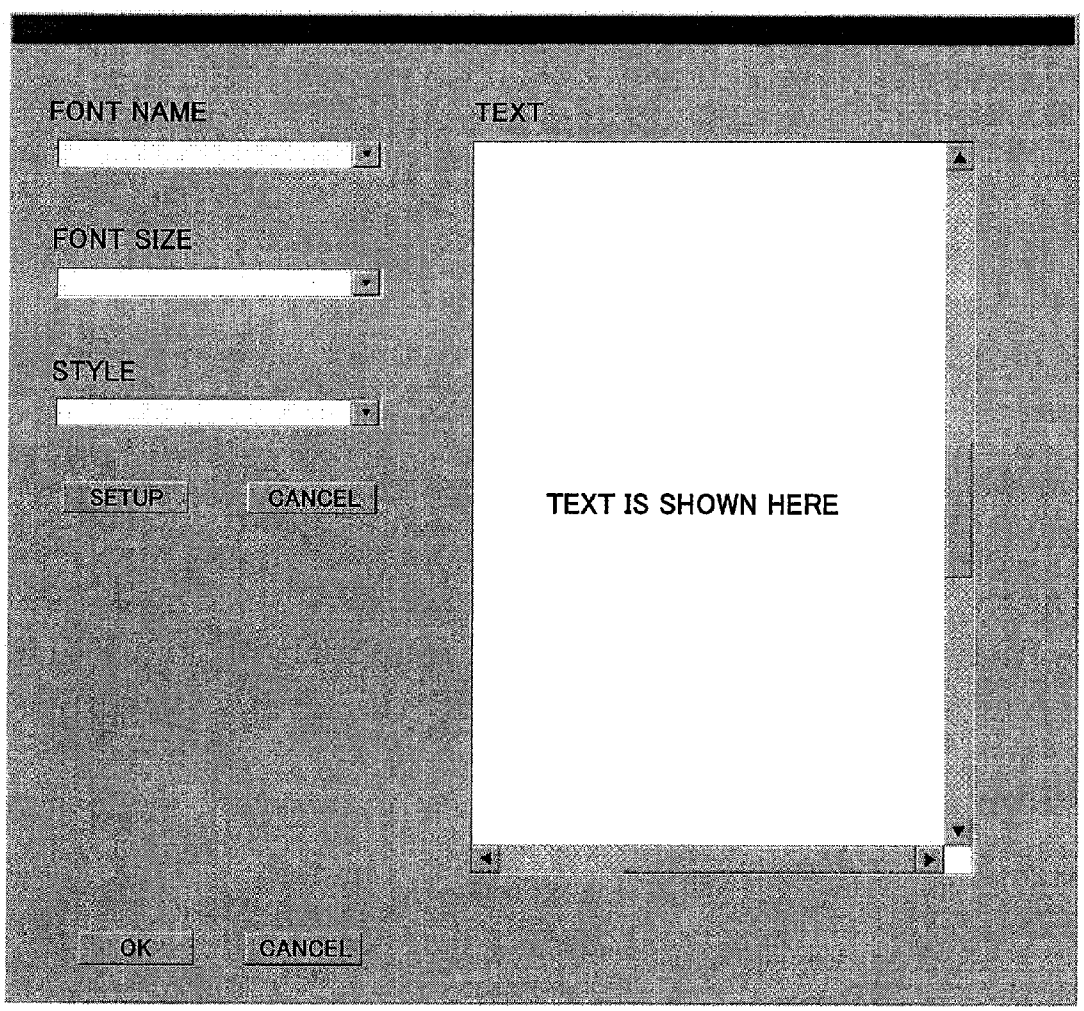
FIG. 8 is an explanatory view showing an example of a screen display when a text is composed by using the personal computer.

As shown in FIG. 7, when the process is initiated, in S1 (S indicates "step", the same applies hereinafter) a user is required, through the display unit 76, to decide whether or not to set a password. Decision of the user is determined based on an input from the operation unit 75. If the user intends to set a password (S1;Y), in S2 the user is required to perform a password input process by inputting a password via the display unit 76 and the operation unit 75. Then, the process proceeds to S3. If the user decides not to set a password (S1:N), the process directly proceeds to S3.

In S3, the user is required, through the display unit 76, to decide whether or not to print a barcode Pa (see FIG. 12), storing font information (to be described hereinafter), on recording paper P. Decision of the user is determined based on an input from the operation unit 75. If the user decides not to print a barcode Pa (S3:N), the process proceeds to S4 wherein print data is created. The print data includes character codes, and font information corresponding to the text composed by the above-described application. Subsequently, in S5 the print data is sent to the multi function apparatus 1 (printer), and then the process in the PC 70 is finished.

On the other hand, if the user decides to print a barcode Pa (S3:Y), the process proceeds to S7. In S7, the user is required, through the display unit 76, to decide whether or not character code information should be stored in the barcode Pa. In the character code information, character codes of respective characters, composing the above-described text, are aligned. Decision of the user is determined based on an input from the operation unit 75. If the character code information should be stored in the barcode Pa (S7:Y), the process proceeds to S8. In S8, the character code information is extracted from the data created by the above-described application, and then the process proceeds to S10. If the character code information is not to be stored in the barcode Pa (S7:N), the process directly proceeds from S7 to S10.

In S10, the user is required, through the display unit 76, to decide whether or not font information of the composed text should be extracted. If the font information should be extracted (S10:Y), in S11 the font information is extracted. In S12, barcode information, to be stored in the barcode Pa, is created.

The font information may be indicated in a table (to be referred to as a font information table), as shown as an example in FIG. 9, wherein a font name (corresponding to the font type), a font size, a style, and a font color are specified in relation to a start position and an end position as details of the font information. The start position and the end position are numerically expressed wherein a value indicates where the start/end position is located from the beginning of the text. The font information may not include at least one of the above-described details. The font information may include only at least one of different details, such as a character spacing, a linefeed width, and so on. Alternatively the font information may include the different details in addition to the at least one of the above-described details.

Figure 10:
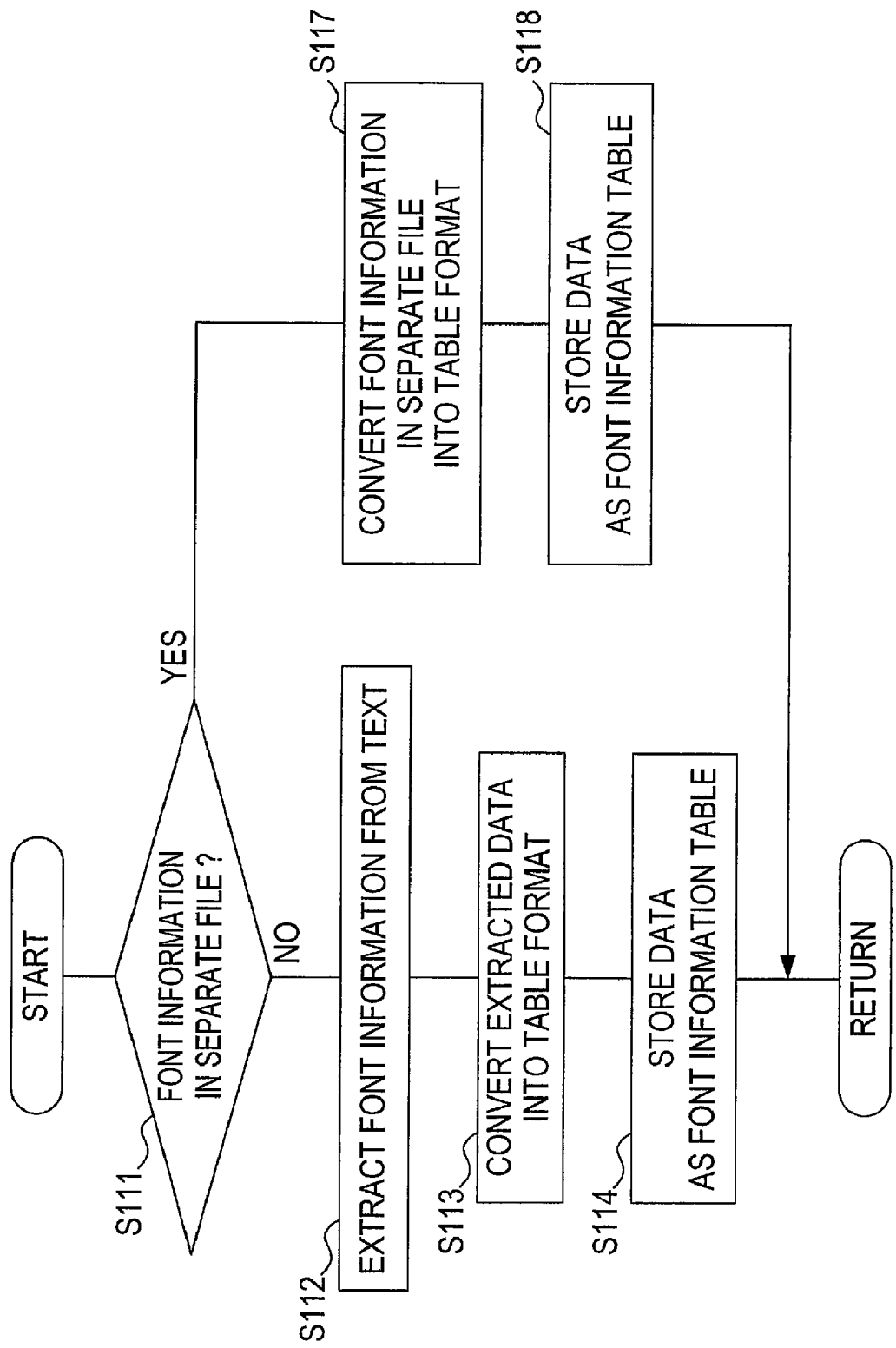
FIG. 10 is a flowchart describing a font information extraction process included in the process shown in FIG. 7.

S11 is described more in detail in FIG. 10. If font information should be extracted (S10:Y), in S111 it is determined whether or not the font information of the composed text is stored in a separate file. If it is determined the font information is not stored in a separate file (S111:N), in S112 the font information of the text is extracted. In S113, the extracted font information is converted into the format of the font information table. In S114, the converted font information is stored as data that constitutes the font information table exemplified in FIG. 9. Then, the process proceeds to S12 (see FIG. 7).

On the other hand, if the font information of the composed text is stored in a separate file (S111:Y), in S117 the font information stored in the separate file is converted into the format of the font information table. In S118, the converted font information is stored as data that constitutes the font information table. Then, the process proceeds to S12 (see FIG. 7).

Referring again to FIG. 7, if font information is not to be extracted (S10:N), in S13 the user is required, through the display unit 76, to decide whether or not to create new font information. Decision of the user is determined based on an input from the operation unit 75. If new font information should be created (S13:Y), in S14 the user is required to create new font information through the display unit 76 and the operation unit 75. Subsequently, the process proceeds to the above-described S12. In this case, font information to be stored in the barcode Pa is different from the font information set in the above-described application. If new font information is not to be created (S13:N), the process directly proceeds from S13 to S12. In this case, font information will not be stored in the barcode Pa.

Figure 11:
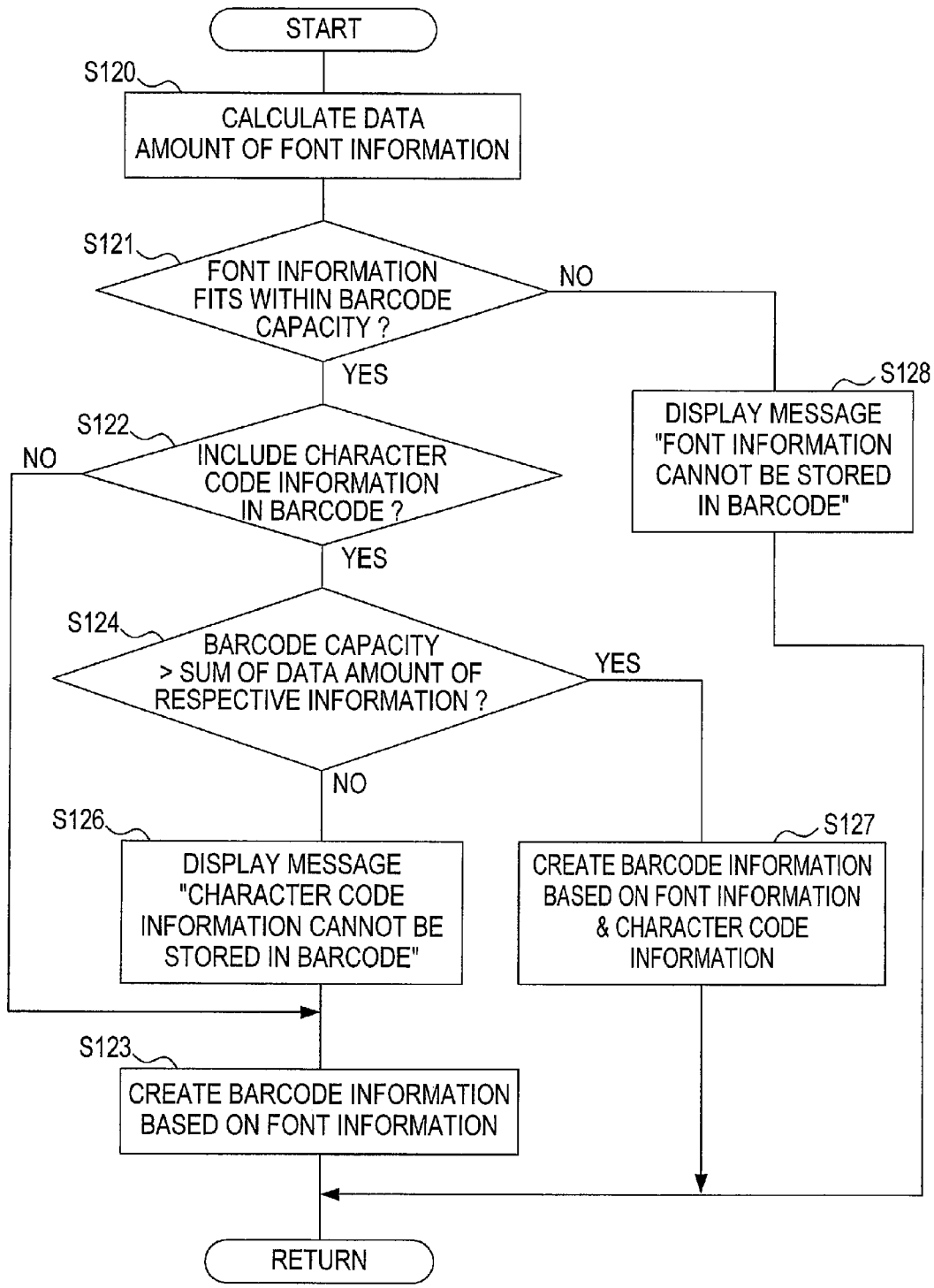
FIG. 11 is a flowchart describing a barcode information creation process included in the process shown in FIG. 7.

When the process proceeds to S12 as described above, barcode information to be stored in the barcode Pa is created as follows. As shown in FIG. 11, in S120 data amount of the above-described font information is calculated. If font information is not to be stored in the barcode Pa (S13:N), the data amount of the font information is calculated as 0.

In S121, it is determined whether or not the above-described font information fits within the limit of the data amount (to be referred to as capacity of the barcode Pa) so that all the information can be stored and printed as a barcode Pa. If the font information fits within the capacity (S121:Y), the process proceeds to S122. In S122, it is determined whether or not the character code information is set in the above-described S7 so as to be stored in the barcode Pa. If the character code information is set not to be stored in the barcode Pa (S122:N), the process proceeds to S123. In S123, barcode information (for example, code data) is created so that the above-described font information (including data for a password, if any password is set) is stored in the barcode Pa. Then, the process proceeds to S15 (see FIG. 7).

If the character code information is set to be stored in the barcode Pa (S122:Y), in S124 it is determined whether or not the sum of the data amount of the font information and the data amount of the character code information is smaller than the capacity of the barcode Pa. If the sum of the data amount of the respective information is equal to or larger than the capacity of the barcode Pa (S124:N), in S126 a message is shown on the LCD 14b so as to indicate that the character code information cannot be stored in the barcode Pa due to capacity shortage. Then, the process proceeds to S123. That is, after the above-described message is shown in S126, in S123 barcode information is created so as to correspond only to the font information (including the data for a password, if any password is set). Subsequently, the process proceeds to S15 (see FIG. 7).

If the sum of the data amount of the font information and the data amount of the character code information is smaller than the capacity of the barcode Pa (S124:Y), in S127 barcode information, is created so as to correspond to the font information and the character code information (including the data of a password, if any password is set). Then, the process proceeds to S15 (see FIG. 7).

If the font information alone is not within the capacity of the barcode Pa (S121:N), in S128 a message is shown on the LCD 14b so as to indicate that the barcode Pa including the font information is not printed due to capacity shortage. Then, the process directly proceeds to S15 (see FIG. 7). In other words, the process proceeds to S15 without creating barcode information in S12. If the character code information is not set to be stored in the barcode Pa (S122:N), and the font information is neither extracted nor created (S13:N), the process proceeds to S15 without creating barcode information in S123, since no data exists to be stored in the barcode Pa.

Referring again to FIG. 7, in S15 it is determined whether or not barcode information has been created. If barcode information has not been created (S1:N), such as in case wherein a negative determination is made in the above-described S121, the process proceeds to above-described S4. In S4, print data is created such that the character code and the font information of the text, composed by the above-described application, are included in the print data. In this case, the print data to be sent to the multi function apparatus 1 does not include any data for printing a barcode Pa.

If barcode information has been created in the above-described S123 or S127 (S15:Y), in S16 print data of the barcode Pa is created based on the barcode information. Subsequently, in S17 print data of the text is created in the same manner as in S4. In S18, the print data of the text is combined with the print data of the barcode Pa created in S16. Then, the process proceeds to S5. In this case, print data sent to the multi function apparatus 1 in S5 includes print data of the text and the print data of the barcode Pa combined together.

Figure 12:
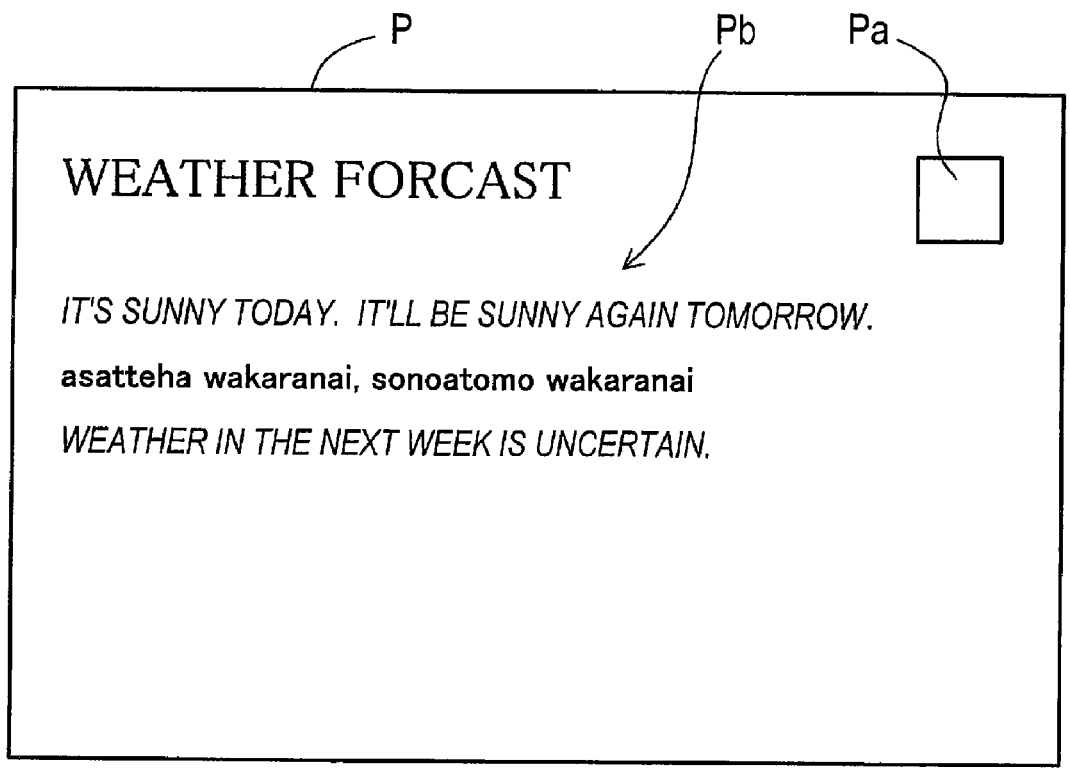
FIG. 12 is an explanatory view showing an example of a print result obtained by the process shown in FIG. 7 via the multi function apparatus.

When the multi function apparatus 1 receives the above-described print data from the PC 70, the multi function apparatus 1 performs printing in a known manner based on the print data. As exemplified in FIG. 12, on a recording paper P (corresponding to the recording medium for an original), a barcode Pa, indicating the above-described various information, and characters Pb, composing the above-described text, are printed. The barcode Pa can be formed with a two-dimensional barcode, such as QR code. As shown in FIG. 12, characters Pb can be printed in various fonts, sizes, styles, and so on. The font information, which specifies the font name, size, style, and the like, can be stored in the barcode Pa as described above.

Figure 13:
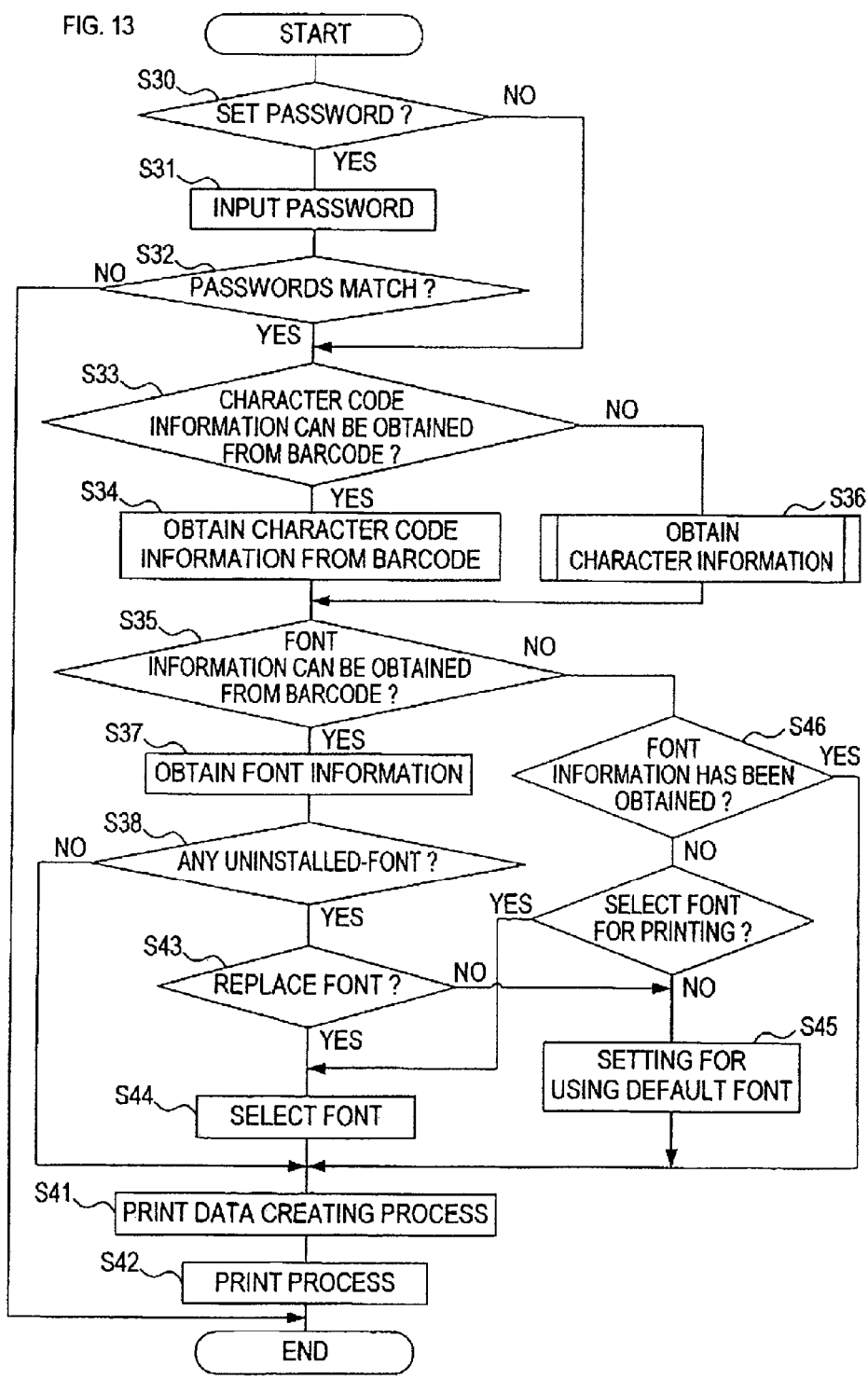
FIG. 13 is a flowchart describing a copy process performed in a special mode of the multi function apparatus according to the embodiment.

The multi function apparatus 1 is configured such that recording paper P, on which characters Pb composing the text and the barcode Pa are printed, can be copied in a special mode wherein the information of the above-described barcode Pa can be used. With reference to FIG. 13, the following describes a process performed by the CPU 61 when some kind of an original is placed on the glass plate 16 and copying in the above-described special mode is instructed by an input from the operational buttons 14a. When the copying is initiated, firstly, the original, which has been placed on the glass plate 16, is read by the image scanner unit 17. The data of the original is stored in a predetermined area of the RAM 63.

As shown in FIG. 13, in S30 it is determined whether or not a password has been set for the data of the barcode Pa read by the image scanner unit 17 and stored in the RAM 63. If a password has been set (S30:Y), in S31 the user is required to input the password via the LCD 14b and the operational buttons 14a. In S32, it is determined whether or not the password inputted by the user and the password stored in the barcode Pa match. For example, in S31 a screen is displayed on the LCD 14b as exemplified in FIG. 15A. In S32, it is determined whether or not the password, inputted by using the number keys or the like in response to the screen display, matches with the password stored in the barcode Pa.

If the inputted password and the password stored in the barcode Pa do not match (S32:N), the process is finished. If no password has been stored in the data of the barcode Pa (S30:N), the process directly proceeds from S30 to S33. Also in a case wherein an ordinary original without a barcode Pa is placed on the glass plate 16, or in a case wherein a barcode Pa is printed on the original but the barcode Pa cannot be read due to a damage by taint or the like, a negative determination is made in S30, and the process directly proceeds to S33.

In S33, it is determined whether or not the character code information can be read from the barcode Pa stored in the RAM 63. If it is determined that the character code information can be read (S33:Y), in S34 the character code information is extracted. Then, the process proceeds to S35. If it is determined that the character code information cannot be read (including a case wherein the barcode Pa does not store character code information, S33:N), in S36 character information obtaining process, to be described below, is performed, and then the process proceeds to S35.

Figure 14:
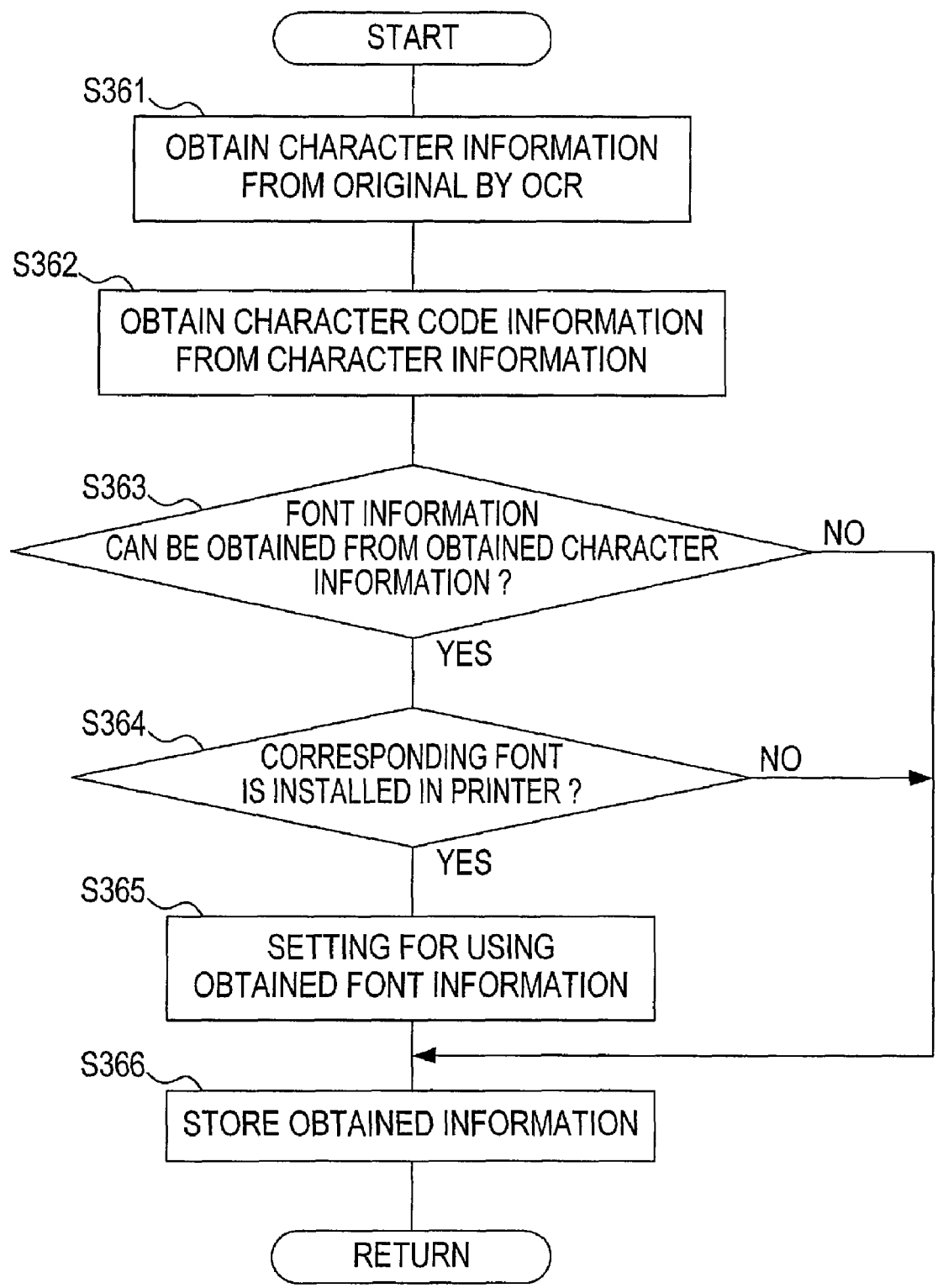
FIG. 14 is a flowchart describing a character information obtaining process included in the copy process.

The following described the character information obtaining process with reference to FIG. 14. In the following, the above-described character code information and the font information are generically referred to as character information. Firstly in S361, character information of the original is obtained by processing the image data of characters Pb, read by the image scanner unit 17 and stored in the RAM 63, by a known optical character reading process (OCR). The OCR is performed by the CPU 61 by running a program stored in the ROM 62. In S362, character code information is obtained from the character information. In S363, it is determined whether or not font information can be obtained from the obtained character information.

If it is determined that the font information can be obtained (S363:Y), in S364 it is determined whether or not the font specified in the font information is installed in the CG 62a of the multi function apparatus 1 (printer). If it is determined that the font is installed (S364:Y), in S365 a flag is set so as to indicate that the obtained font information is used. In S366, respective information obtained by the above-described steps is stored in a predetermined area of the RAM 63. Then, the process proceeds to S35 (see FIG. 13). On the other hand, if font information cannot be obtained from the character information obtained by OCR (S363:N) or in a case wherein the font specified by the obtained font information is not installed in the multi function apparatus 1 (S364:N), the process directly proceeds to the above-described S366 without setting a flag in S365 for using font information.

Referring again to FIG. 13, in S35 it is determined whether or not font information can be read from the barcode Pa stored in the RAM 63. If font information can be read (S35:Y), the font information is obtained in S37. In S38 it is determined whether or not the font information obtained in S37 includes any font which is not installed in the multi function apparatus 1. If it is determined that all the fonts corresponding to the font information are installed in the multi function apparatus 1, the process proceeds to S41. In S41, print data in dot image is created by combining the character code information and the above-described font information obtained in S34 or in S36, and converting the combined information by the CG 62a. In S42, a drive signal is outputted to the recording head 4, the LF motor 131, and the CR motor 132, and printing is performed. Then, the process is finished. As a result, characters Pb are printed on the recording paper P, as shown as an example in FIG. 12, in the same fonts used in the original.

On the other hand, if it is determined that the font information extracted from the barcode Pa includes a font which is not installed in the multi function apparatus 1 (S38:Y), in S43 the user is required, through the LCD 14b, to decide whether or not to replace the uninstalled-font with a font which is installed in the multi function apparatus 1. Then, it is determined whether or not font replacement should be performed. The step of S43 is performed by, for example, indicating the name of the uninstalled-font on the LCD 14b as exemplified in FIG. 15B. If the uninstalled-font should be replaced (S43:Y), in S44 the user is required, through the LCD 14b and the operation buttons 14a, to select an installed-font for replacement. Then, the process proceeds to the above-described S41. The step of S44 is performed by, for example, showing a screen on the LCD unit 14b as exemplified in FIG. 15C. If the uninstalled-font is not to be replaced (S43:N), in S45 setting is changed so as to use a default font. Then, the process proceeds to the above-described S41. As described above, if, for example, some of the fonts of the above-described characters Pb are not installed (S38:Y), the uninstalled-font can be replaced with either a selected font or the default font, and printing can be performed.

If font information cannot be read from the barcode Pa (S35:N), in S46 it is determined whether or not font information has been obtained by the above-described OCR. That is, it is determined whether or not the above-described flag setting has been done in S365. If font information has been already obtained (S46:Y), the process proceeds directly to the above-described S41. Then, in S42 printing is performed based on the font information set for printing use and the above-described character code information.

On the other hand, if font information has not been obtained (S46:N), in S47 the user is required, through the LCD 14b, to decide whether or not to select a font for printing. The decision of the user is determined based on an input by the operation buttons 14a. If a font for printing should be selected (S47:Y), the process proceeds to the above-described S44. If a font for printing is not to be selected (S47:N), the process proceeds to the above-described S45. As described above, even if font information is not stored in the barcode Pa, or although font information is stored in the barcode Pa, the font information cannot be read because the barcode Pa is damaged due to taint (in both cases S35:N), printing can be performed by using one of the fonts obtained by OCR, selected by a user, or set by default.

As described above, in the present embodiment, printing can be performed based on character code information and font information read as data from the barcode Pa, or read by OCR from an original (the recording paper P). Therefore, the characters in the original can be reproduced without being indistinct.

Moreover, if font information, the data amount of which is relatively small, is stored in the barcode Pa, and character code information is directly read from an original, printing can be performed in the fonts precisely identical to the font used in the original without having a limit to the number of characters.

If font information is stored in the barcode Pa, recognition of characters may be performed based on the stored font information when character information is obtained by OCR in S361.

Specifically, for example, S37, which is performed when an affirmative determination is made in S35 shown in FIG. 13, may be performed prior to S36. In this way, the accuracy in recognition of characters by OCR can be furthermore improved.

Additionally, in the present embodiment, characters Pb can be suitably reproduced even in a case wherein a barcode Pa is not provided to an original, or in a case wherein information cannot be obtained from a barcode Pa due to taint damage or the like. This is because both character code information and font information can be read from an original, and printing can be performed based on the read information.

Other Embodiments

The present invention is not limited to the above-described embodiment. Variations and modifications are possible without departing from the subject-matter of the present invention. For example, the PC 70 and the multi function apparatus 1 may be connected via Internet. Moreover, although the print data of the barcode Pa and the print data of the text can be combined and sent to the multi function apparatus 1 (S17, S5) in the above-described embodiment, the print data of the barcode Pa and the print data of the text may be separately sent to the multi function apparatus 1.

Furthermore, the present invention may be applied to various image forming apparatus, such as an image forming apparatus including a laser print unit, or an image forming apparatus including a print unit for monochrome printing. In a case wherein the print unit is configured so as to be capable of double-side printing, a barcode Pa may be printed on a back side of recording paper P. Still furthermore, the graphic code according to the present invention may be a graphic code, such as a one-dimensional barcode, other than a two-dimensional barcode.

In case of capacity shortage of the barcode Pa, a message can be shown in the above-described embodiment (S126, S128), and barcode information can be created wherein one part of data is omitted. However, after showing the message in S126 or S128, the process may return to S7 so as to require the user to reselect information to be stored in the barcode Pa.

Although the specific embodiments have been illustrated and described herein, it will be appreciated by those of ordinary skill in the art that any arrangement to achieve the same type of purpose may be substituted for the specific embodiments shown. It is to be understood that the above description is intended to be illustrative, and not restrictive. Combinations of the above embodiments and other embodiments will be apparent to those of skill in the art upon reviewing the above description. The scope of the invention includes any other applications in which the above structures and processes are used. Accordingly, the scope of the invention should only be determined with reference to the appended claims, along with the full scope of equivalents to which such claims are entitled.

What is claimed is:

1. An image forming apparatus with a copy function comprising:
   a reading device that reads characters on a first recording medium;
   a password extraction device that extracts a password from a graphic code provided on the first recording medium;
   a determination device that determines whether or not the extracted password matches an input password received from a password input device;
   a font information extraction device that extracts font information of the characters from the graphic code when the determination device determines that the extracted password matches the input password;
   a setting device that:
     sets the font information extracted by the font information extraction device as font information used for conversion when all of the font information extracted by the font information extraction device is determined to be stored in the image forming apparatus, and
     sets one of predetermined default font information and the font information stored in the image forming apparatus as font information for conversion based on an input, instead of the font information extracted by the font information extraction device, when part of the font information extracted by the font information extraction device is determined to be not stored in the image forming apparatus;
   a recognition device that recognizes the characters based on a result of reading performed by the reading device;
   a conversion device that converts a result of recognition performed by the recognition device into image data which indicates shapes of the characters, wherein the characters are formed based on the font information set by the setting device; and
   a print device that prints the characters on a second recording medium based on the image data.

2. The image forming apparatus with the copy function as set forth in claim 1,
   wherein the recognition device recognizes character codes, which indicate the characters, and font information of the characters based on the result of reading, and
   wherein, when the font information is not extracted by the font information extraction device, the conversion device converts the character codes into image data, which indicates shapes of the characters, based on the font information recognized by the recognition device.

3. The image forming apparatus with the copy function as set forth in claim 2 furthermore comprising a user interface by which font information is adapted to be inputted by a user
   wherein, when the conversion device does not perform conversion into the image data based on the font information recognized by the recognition device, the conversion device performs conversion of the characters recognized by the recognition device into the image data based on font information inputted via the user interface.

4. The image forming apparatus with the copy function as set forth in claim 2 wherein, when the conversion device does not perform conversion into the image data based on the font information recognized by the recognition device, the conversion device performs conversion of the characters recognized by the recognition device into the image data based on predetermined font information.

5. The image forming apparatus with the copy function as set forth in claim 1 wherein the font information comprises information regarding at least one of a size, a type, a style, and a color of font, and spacing between characters.

6. The image forming apparatus with the copy function as set forth in claim 1 furthermore comprising a code extraction device that extracts character codes from the graphic code
   wherein, when character codes are extracted from the graphic code by the code extraction device, the conversion device performs conversion into the image data based on the character codes extracted by the code extraction device.

7. The image forming apparatus with the copy function as set forth in claim 6 wherein, when character codes are not extracted from the graphic code by the code extraction device, the recognition device recognizes character codes, which indicate characters on the first recording medium, based on the result of reading, and the conversion device performs conversion into the image data based on the character codes recognized by the recognition device.

8. The image forming apparatus with the copy function as set forth in claim 1 furthermore comprising a user interface by which font information is adapted to be inputted by a user
   wherein, when the conversion device does not perform conversion into the image data based on the font information set by the setting device, the conversion device performs conversion of the characters recognized by the recognition device into the image data based on font information inputted via the user interface.

9. The image forming apparatus with the copy function as set forth in claim 1 wherein, when the conversion device does not perform conversion into the image data based on the font information set by the setting device, the conversion device performs conversion of the characters recognized by the recognition device into the image data based on the predetermined default font information.

10. The image forming apparatus as set forth in claim 1 wherein a process for extracting the font information conducted by the font information extraction device is performed after a character recognition process conducted by the recognition device.

11. The image forming apparatus with the copy function as set forth in claim 1 wherein a character recognition process conducted by the recognition device is performed after a process for extracting the font information conducted by the font information extraction device.

12. The image forming apparatus as set forth in claim 1, wherein
the recognition device recognizes the characters when the determination device determines that the extracted password matches the input password;
the conversion device converts the result of recognition performed by the recognition device when the determination device determines that the extracted password matches the input password; and
the print device prints the characters on a second recording medium when the determination device determines that the extracted password matches the input password.

* * * * *